United States Patent [19]

Chuter et al.

[11] Patent Number: 5,367,394
[45] Date of Patent: Nov. 22, 1994

[54] TEST APPARATUS

[75] Inventors: Jeremy B. Chuter, Suffolk; Michael A. Hale; Donald E. A. Clarke, both of Essex, all of England

[73] Assignee: British Telecommunications public limited company, London, England

[21] Appl. No.: 50,028

[22] PCT Filed: Nov. 21, 1991

[86] PCT No.: PCT/GB91/02060
§ 371 Date: Apr. 29, 1993
§ 102(e) Date: Apr. 29, 1993

[87] PCT Pub. No.: WO92/10036
PCT Pub. Date: Jun. 11, 1992

[30] Foreign Application Priority Data

Nov. 22, 1990 [GB] United Kingdom ............... 9025399
Nov. 23, 1990 [GB] United Kingdom ............... 9025492

[51] Int. Cl.$^5$ .......................................... H04B 10/08
[52] U.S. Cl. .................................. 359/110; 359/125; 359/167; 371/20.1; 370/13
[58] Field of Search ............... 359/110, 125, 132, 137, 359/143, 167; 371/20.1, 29.1; 370/13

[56] References Cited

U.S. PATENT DOCUMENTS

| 4,516,216 | 5/1985 | Armstrong | 364/514 |
| 5,046,807 | 9/1991 | Unitt | 359/137 |
| 5,153,764 | 10/1992 | Faulkner et al. | 359/167 |

FOREIGN PATENT DOCUMENTS

| 0137339 | 8/1983 | Japan | 359/110 |
| 0143619 | 6/1990 | Japan | 359/110 |
| 2229881 | 10/1990 | United Kingdom | 359/110 |
| WO88/09093 | 11/1988 | WIPO . | |
| 2007432 | 4/1992 | WIPO | 359/110 |

OTHER PUBLICATIONS

Patent Abstrcts of Japan, No. JP58164357, Sep. 29, 1983, Kazumi, "Title Monitoring Control System".
IEEE Global Telecommunications Conference, Globecom 85, vol. 3, No. 44.5, 4 Dec. 1985, New Orleans, Louisiana, pp. 4451–4456, D. G. Allan et al, "Design of Integrated Surveillance Systems for High Capacity Fiber Systems".

*Primary Examiner*—Richard E. Chilcot, Jr.
*Assistant Examiner*—K. Negash
*Attorney, Agent, or Firm*—Nixon & Vanderhye

[57] ABSTRACT

A test apparatus is designed for use with a TPON system including a headend station connected via a fibre optic network to a plurality of terminations. The test apparatus is a self-contained unit including a connection for linking the apparatus to a termination, a first detection circuit which detects status signals generated by the termination, and a second detection circuit which detects alarm signals generated in the head-end station and transmitted to the termination in a downstream data frame. The test apparatus in response to the first and second test circuits provides an output which indicates the condition of the termination. In one example, a series of indicator lamps formed on the housing for the test apparatus are lit to provide the appropriate output.

5 Claims, 3 Drawing Sheets

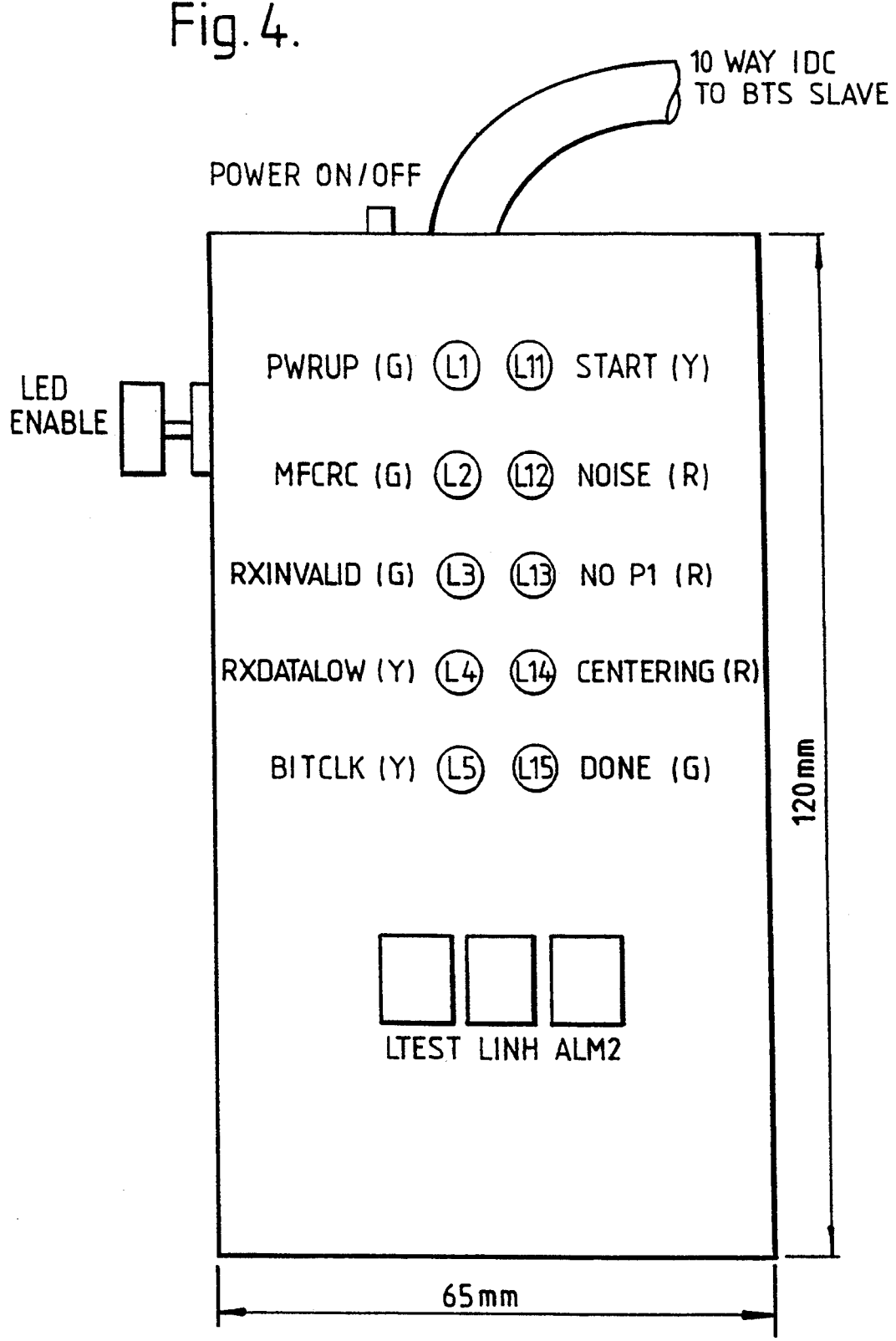

TEST APPARATUS

BACKGROUND OF THE INVENTION

1. Field of the Invention

The present invention relates to test apparatus, and, in particular, to apparatus suitable for use in conjunction with a passive optical network (PON) system.

2. Related Art

The applicant's International patent applications numbers GB 90/01758 (WO91/08623) and GB 91/00100 describe a TPON (Telephony on a Passive Optical Network) system designed to carry data via a Bit Transport System (BTS). The TPON system includes a head-end station having a time division multiple access (TDMA) master which assembles incoming exchange traffic into TDMA frames. These frames are broadcast via an optical stage onto a fibre network. Each of a number of terminations connected to the network recognizes and responds to an appropriately addressed portion of the data in the broadcast frame and ignores the remainder of the frame.

The header portion of each frame includes regions used for the monitoring and control of the system. In particular, as described in the above mentioned applications, upstream TDMA frames may include a ranging check pulse transmitted by a termination. In response to this ranging check pulse the head-end station transmits control signals to the termination to modify the timing of transmissions from the termination so as to correct for any variations in the time of receipt of the transmissions. The transmission from a termination is arranged to be delayed, with respect to the receipt of a TDMA frame, by a certain amount as determined by the head-end station such that the terminal transmission is in its correct place in the upstream TDMA frame received at the head-end station. The head-end station is typically arranged to generate an alarm signal if the terminal transmission delay as measured by the receipt of the ranging pulse falls outside a predetermined range. The head-end station may also transmit a diagnostic signal onto the network, as described in our International patent application number GB 91/01815.

While monitoring and control procedures of the type outlined above are effective once the TPON system is fully installed and running they are not in themselves capable of providing all the diagnostic functions necessary for a termination whilst that termination is being installed. Moreover those diagnostic functions which can be carried out provide an output in the form of alarm signals or other indications of the state of the network only at the head-end station. The relevant information is not then available directly for use by, for example, an engineer installing a termination at a position remote from the head-end station.

BRIEF SUMMARY OF THE INVENTION

According to the present invention there is provided a test apparatus for use with a PON system comprising a head-end station connected via a fibre optic network to a plurality of terminations, each termination being arranged to carry out self-diagnostic procedures and to generate status signals for transmission to the head-end station, the apparatus being characterised by means for data communication with a said termination, first detection means arranged to detect, in use, status signals generated by the termination, second detection means arranged to detect, in use, alarm signals in a data frame transmitted from the head-end station via the fibre optic network and received at the termination, and indication means responsive to the first and second detection means to provide an output indicative of the condition of the termination.

The present invention provides a test apparatus capable of carrying out local diagnostic tests on a termination, and also of providing local access to diagnostic procedures carried out by the head-end station. Such an apparatus greatly facilitates the work, for example, of an engineer installing a new termination by making it possible for that engineer to carry out a range of diagnostic tests on site.

In a test apparatus for use with a PON system in which the head-end station and the terminations are arranged to transmit and receive data frames comprising a plurality of basic frames preceded by a header portion, each downstream basic frame including control channels addressed to different respective terminations, and each control channel including one or more bits in a predetermined position which are set by the head-end station to indicate an alarm condition, preferably the second detection means includes means for reading bits in the predetermined bit position in a frame received at the termination.

In a test apparatus for use with a PON system in which each termination includes a dedicated asynchronous serial interface for data communication, in use, with a test apparatus, preferably the means for data communication is arranged to control, in use, transfer of data via said interface.

Preferably the test apparatus includes means for generating a signal for transmission via the termination to the head-end station. Preferably the test apparatus includes means for generating a laser inhibit signal for transmission to the termination to turn off a laser optical source within the termination.

BRIEF DESCRIPTION OF THE DRAWINGS

An apparatus in accordance with the present invention will now be described in detail with reference to the accompanying drawings in which:

FIG. 4 is a plan of the tester of FIG. 3.

DETAILED DESCRIPTION OF EXEMPLARY EMBODIMENTS OF THE INVENTION

A TPON system comprises a head-end station 1, a number of terminations 2, and a passive fibre optic network 3 linking the head-end station 1 to the terminations (e.g., subscriber stations or outstations) 2. Although, for clarity, only three terminations are shown, in practice many more terminations will be connected to a single head-end station. Typically the head-end station is located in a local telephone exchange and the terminations 2 are subscriber stations in domestic or commercial premises or street cabinets in the neighbourhood of the local exchange.

The head-end station 1 broadcasts data over the fibre network 3 as time division multiple access (TDMA) frames having a predetermined format. The frames include control channels addressed to specific ones of the terminations 2 to control, amongst other parameters, the amplitude and timing of the optical signals transmitted onto the fibre network 3 by the terminations 2.

In the upstream direction, each termination 2 transmits data in a predetermined time slot, which data is assembled into a TDMA frame at the head-end station 1.

Figure 1:
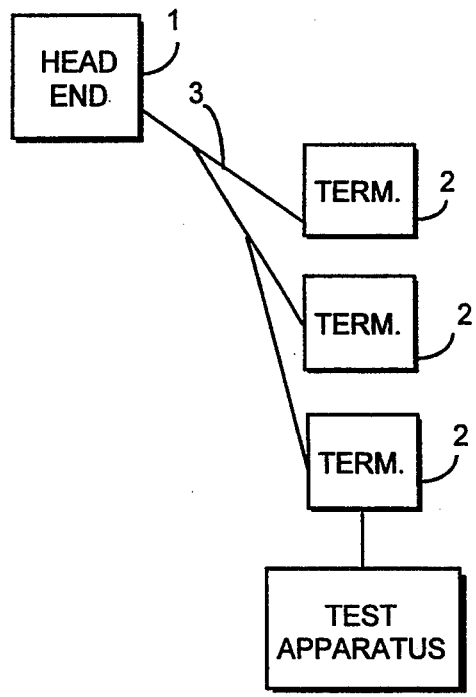
FIG. 1 is a block diagram of a TPON system.
Figure 2A:
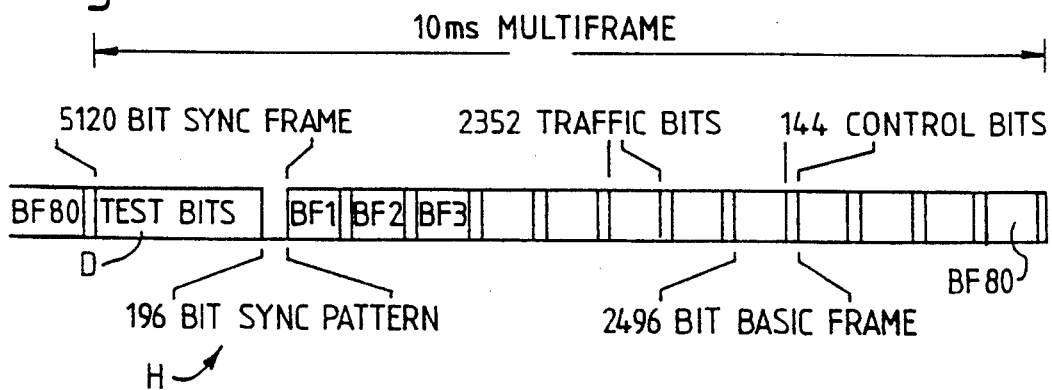
FIGS. 2a and 2b are downstream and upstream TDMA frames respectively.
Figure 2B:
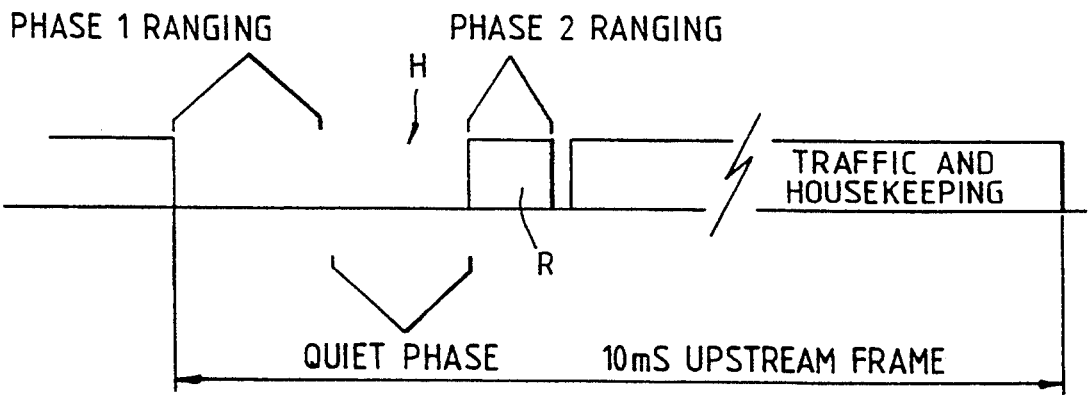

FIGS. 2a and 2b show the format of downstream and upstream frames, respectively. Basic data is communicated in eighty basic frames BF1 . . . BF80. The basic frames BF1 . . . BF80 are preceded by a header portion H which, in the upstream direction, includes a phase-2 ranging section R, 720 bits long. Each termination 2 is arranged to transmit onto the fibre network 3 a ranging pulse timed to arrive at a respective predetermined position within the ranging section R. The head-end station 1 determines the phase of each arriving ranging pulse and then transmits control signals to the respective termination 2, in the control portion of the basic frames, to advance or retard the timing of the transmission.

In the downstream direction, the header portion includes a region D which, as described in our above mentioned patent application number GB 91/01815, includes an optical time domain reflectometry (OTDR) diagnostic signal. The head-end station 1 detects any return of the OTDR signal occurring as the result of a partial or complete break in the network.

Each control channel in the downstream basic frames includes three mode bits which may be used, as described in further detail below, to communicate alarm signals from the head-end station 1 to a termination 2 for detection by a test apparatus T connected to the termination 2.

Figure 3:
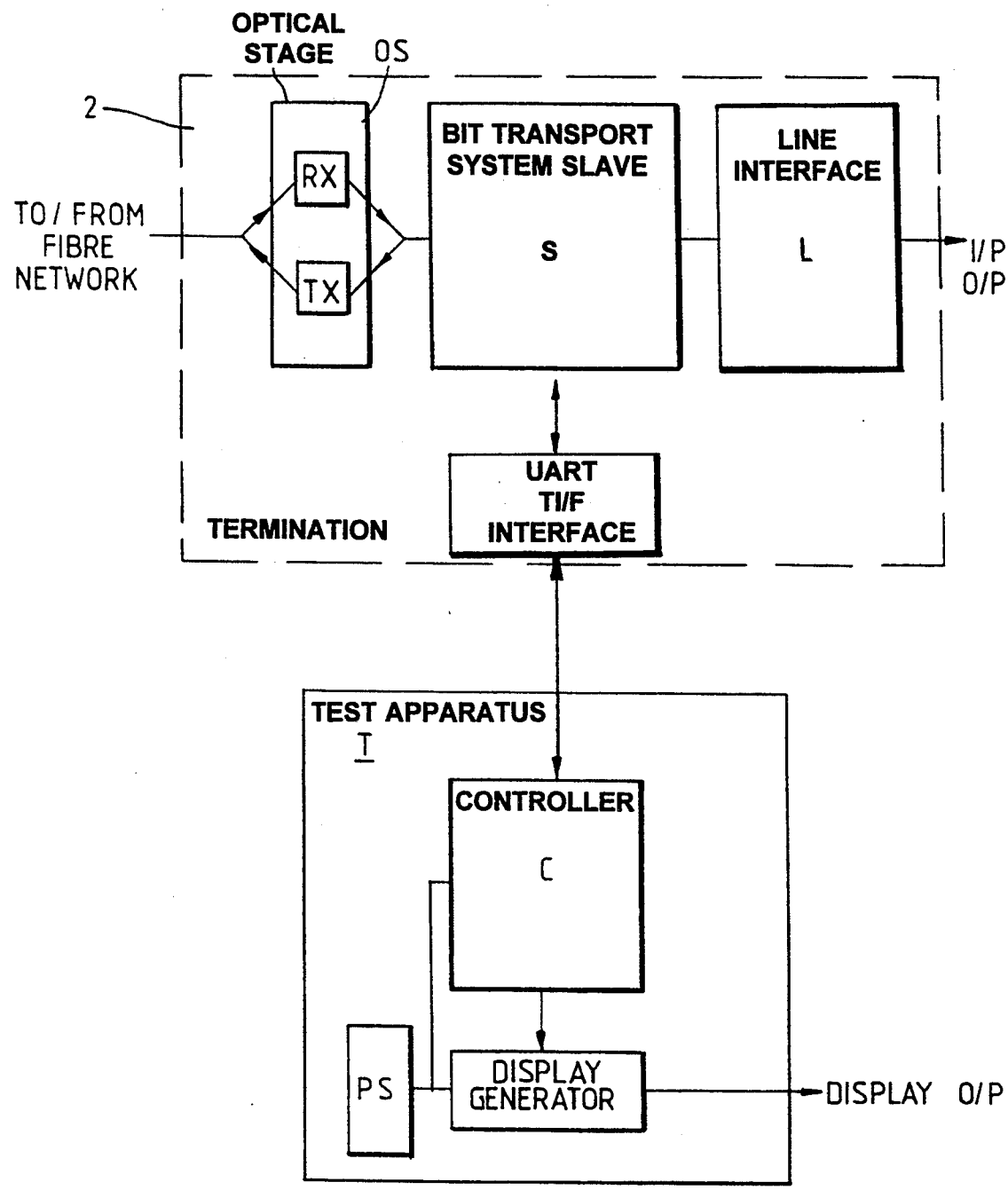
FIG. 3 is a diagram showing a termination and test apparatus in greater detail.

FIG. 3 shows the test apparatus T and the respective termination 2 in greater detail.

The front end of the termination 2 comprises an optical stage OS comprising an optical receiver RX which receives optical signals from the network and using an appropriate photodetector converts them to electrical signals, and an optical transmitter TX, which carries out the converse process, using an optical source such as a laser diode to convert electrical signals into optical signals for transmission onto the network in the upstream direction. Data from the optical stage OS is received and decoded in a Bit Transport System (BTS) slave S which recognizes those portions of incoming TDMA frames having an address appropriate to the particular termination 2. The corresponding traffic data is then decoded and output to a line interface L. The BTS slave S also carries out various control and supervisory functions in response to control data in the incoming TDMA frame. In particular, it generates ranging pulses for transmission to the head-end station 1, and adjusts the timing of transmissions of data from the termination 2 in response to control signals generated and transmitted from the head-end station 1.

After the termination 2 has been installed at a desired location, a test unit T is connected to the termination, as shown in FIG. 3. The tester T includes a controller C arranged to communicate data with the termination 2 via a UART interface TI/F. The test procedures fall into two categories.

Firstly, local self-diagnostic test procedures are carried out by the termination independently of the head-end station. The BTS slave S carries out a number of diagnostic procedures to ascertain, for example, that the optical stage is operational and responds appropriately to an output from the BTS slave S. Similarly the BTS slave S will check that there is electrical continuity between the slave S and the optical stage OS and between the slave S and the line interface L. When the appropriate diagnostic procedures have been completed then the slave S sends a series of alarm indications to the tester T via the interface TI/F to indicate whether or not each of the tested features is functioning satisfactorily. In response to these alarm signals, the tester T generates a display to indicate to the engineer using the tester T the hardware status of the termination. In the present example the casing of the tester T shown in FIG. 4 includes columns of LED lamps L1–L5, L11–L15 and these are illuminated to indicate the results of the tests.

After the successful completion of the local test procedures, the tester T, either automatically or in response to a control input from the user (via push button ALM2), carries out a second category of testing in conjunction with the head-end station. The controller C generates a signal for transmission via the termination to the head-end station. The head-end station responds to receipt of this signal from the tester T and carries out a number of diagnostic and control procedures including, for example, using the ranging pulses transmitted from the particular termination to synchronise the termination to the head-end clock, interrogating the BTS slave to determine the identifying code of the termination, and determining whether the amplitude of ranging pulses transmitted from the termination falls in the desired operating range.

Depending upon the results of the tests, the head-end station sets the values of three predetermined mode bits in the control channel transmitted to the termination 2. These mode bits indicate whether or not the ranging process has been successfully completed and, if not, also indicates the nature of the failure. These mode bits are received at the BTS slave S where they are read via the interface TI/F by the tester T.

The tester unit T decodes the test bits and again generates an appropriate display to indicate the result of the diagnostic procedures. In the present example, the second column of lamps L11–L15 is used to indicate the results of the tests carried out using the head-end station, whilst the column of lamps L1–L5 is used to indicate the results of the tests carried out locally within the termination 2.

Tables 1 and 2 below list the test functions and corresponding display outputs for the local and system tests respectively. Table 3 lists the values assigned to the mode bits by the head-end station in accordance with the results of the ranging procedure. In addition to the functions listed in the tables the tester provides the following functions, actuated by push buttons mounted on the case: LTEST - lamp test, this illuminates all the LED's in a slave unit; LINH - laser inhibit, this turns off the laser in the termination's optical stage OS; ALM2 - status alarm 2—this transmits a service request signal via the termination 2 to the head-end station to cause it to carry out the aforementioned second category of diagnostic and control procedures.

TABLE 1

| BTS signal name | HARDWARE STATUS | | |
|---|---|---|---|
| | Colour | State | Description |
| PWRUP | GREEN | ON | System enabled (powered up). |
| MFCRC | GREEN | ON | Valid Cyclic |

TABLE 1-continued

HARDWARE STATUS

| BTS signal name | Colour | State | Description |
|---|---|---|---|
| | | | Redundancy Check (CRC) received. This indicates that the SLAVE is synchronised to the MASTER. |
| RXINVALID | GREEN | ON | Optics receiver is recovering valid clock and data. |
| RXDATALOW | YELLOW | ON | Received laser power high enough to allow correct operation of the receiver. If this is off, and RXINVALID is on, then light level is marginal, but enough for the receiver to work. |
| BITCLK | YELLOW | PULSED | Bit clock from line interface to analogue line. Has no effect on ranging process. |

TABLE 2

RANGING STATUS

| Function | Colour | State | Description |
|---|---|---|---|
| START | YELLOW | ON | BTS MASTER is attempting to range the optical end. |
| NOISE | RED | ON | BTS MASTER detected unexpected, 'noise', pulses in the Phase 1 area. |
| NO PHASE 1 | RED | ON | BTS MASTER did not detect a returned Phase 1 pulse from the optical end. |
| CENTERING | RED | ON | BTS MASTER detected a control problem - Phase 2 pulse centering failed. |
| DONE | GREEN | ON | Optical end was successfully interrogated - not necessarily configured for traffic. |

TABLE 3

| Ranging code | Mode | Description |
|---|---|---|
| 0 | 7 | No error - ie unit passed. |
| 1 | 6 | Noise in the Phase 1 area. |
| 2 | 5 | No Phase 1 pulse received. |
| 3 | 4 | |
| 4 | 3 | - Phase 2 centering failure. |
| 5 | 2 | |
| — | 1 | Unit configured (initialised). |

We claim:

1. A test apparatus for use with a passive optical network (PON) system having a head-end station connected via a fibre optic network to a plurality of terminations, each termination including means to carry out self-diagnostic procedures and to generate status signals for transmission to the head-end station, said test apparatus comprising:
   means for direct connection with one of said terminations at the site of the connected termination and for data communication with that termination,
   first detection means to detect status signals generated by the termination connected thereto,
   second detection means to detect alarm signals in a data frame transmitted from the head-end station via the PON and received at the termination connected thereto, and
   indication means responsive to the first and second detection means to provide an output indicative of the condition of the termination connected thereto.

2. A test apparatus according to claim 1, for use with a PON system in which the head-end station and the terminations include means to transmit and receive data frames having a plurality of basic frames preceded by a header portion, each downstream basic frame including control channels addressed to different respective terminations, and each control channel including one or more bits in a predetermined position which are set by the head-end station to indicate an alarm condition;
   said second detection means including means for reading bits in the predetermined bit position in frames received at the termination connected thereto.

3. A test apparatus according to claim 1, for use with a PON system in which each termination includes a dedicated asynchronous serial interface for data communication,
   said means for data communication including means to control transfer of data via said interface.

4. A test apparatus according to any one of the preceding claims, including means for generating a signal for transmission via the connected termination to the head-end station.

5. A test apparatus according to claim 1 including means for generating a laser inhibit signal for transmission to the termination to turn off a laser optical source within the termination.

* * * * *